United States Patent
Riley et al.

(10) Patent No.: US 8,981,992 B2
(45) Date of Patent: Mar. 17, 2015

(54) METHODS AND APPARATUSES FOR SELECTIVELY VALIDATING SATELLITE POSITIONING SYSTEM MEASUREMENT INFORMATION

(75) Inventors: Wyatt Thomas Riley, Chesterbrook, PA (US); Quanwei Liu, Sunnyvale, CA (US)

(73) Assignee: QUALCOMM Incorporated, San Diego, CA (US)

(*) Notice: Subject to any disclaimer, the term of this patent is extended or adjusted under 35 U.S.C. 154(b) by 773 days.

(21) Appl. No.: 12/577,655

(22) Filed: Oct. 12, 2009

(65) Prior Publication Data

US 2011/0084878 A1    Apr. 14, 2011

(51) Int. Cl.
*G01S 19/40* (2010.01)
*G01S 19/20* (2010.01)

(52) U.S. Cl.
CPC .................................. *G01S 19/20* (2013.01)
USPC .................................................. 342/357.23

(58) Field of Classification Search
CPC ..................................................... G01S 19/20
USPC .................................................. 342/357.23
See application file for complete search history.

(56) References Cited

U.S. PATENT DOCUMENTS

| | | | |
|---|---|---|---|
| 6,313,786 B1 | 11/2001 | Sheynblat et al. | |
| 7,660,588 B2 | 2/2010 | Sheynblat et al. | |
| 8,289,159 B2 | 10/2012 | Julian et al. | |
| 2008/0223131 A1* | 9/2008 | Vannucci et al. | 73/510 |
| 2009/0096671 A1* | 4/2009 | Mizuochi | 342/357.12 |
| 2009/0171583 A1* | 7/2009 | DiEsposti | 701/213 |
| 2011/0210889 A1* | 9/2011 | Dai et al. | 342/357.29 |

FOREIGN PATENT DOCUMENTS

| | | |
|---|---|---|
| EP | 1102399 A2 | 5/2001 |
| EP | 1 744 454 A2 * | 1/2007 |
| JP | 2001194444 A | 7/2001 |
| JP | 2009098099 A | 5/2009 |
| WO | WO-0045191 A2 | 8/2000 |
| WO | WO-2004036240 | 4/2004 |
| WO | WO-2007127886 A2 | 11/2007 |

OTHER PUBLICATIONS

Kuusniemi et al., "User-Level Reliability Monitoring in Urban Personal Satellite-Navigation", IEEE Transactions on Aerospace and Electronic Systems, vol. 43, No. 4, Oct. 1, 2007, pp. 1305-1318.*
Clark et al., "GPS/INS Integration with Fault Detection and Exclusion in Shadowed Environments", Positon, Location and Navigation Symposium 2008, May 5, 2008, pp. 1-8.*

(Continued)

*Primary Examiner* — Frank J McGue
(74) *Attorney, Agent, or Firm* — Jennifer M. Pascua (57) ABSTRACT

Methods and apparatuses are provided that may be implemented in various electronic devices to identify suspect measurements for use in a position/velocity/time estimation filter and provide corresponding validated measurements that may be either operatively re-weighted in some manner or operatively one-sided isolated in some manner when subsequently considered by the position/velocity/time estimation filter.

44 Claims, 4 Drawing Sheets

(56) References Cited

OTHER PUBLICATIONS

Leppakoski et al., "RAIM and Complementary Kalman Filtering for GNSS Reliability Enhancement",, Positon, Location and Navigation Symposium 2006, Oct. 25-27, 2006, pp. 948-956.*

Diesel J, et al., "GPS/IRS AIME: Calculation of Thresholds and Protection Radius Using Chi-Square Methods", Proceedings of the Institute of Navigation (ION) GPS, XX, XX, Sep. 1, 1995, pp. 1959-1964, XP002434515.

International Search Report and Written Opinion—PCT/US2010/052065, International Search Authority—European Patent Office—Mar. 17, 2011.

Parkinson B W, et al., "Autonomous GPS Integrity Monitoring Using the Pseudorange Residual", Navigation, Institute of Navigation, Fairfax, VA} US, vol. 35, No. 2, Jun. 1, 1998, pp. 255-274, XP008064597, ISSN: 0028-1522.

Taiwan Search Report—TW099134769—TIPO—Apr. 3, 2013.

* cited by examiner

METHODS AND APPARATUSES FOR SELECTIVELY VALIDATING SATELLITE POSITIONING SYSTEM MEASUREMENT INFORMATION

BACKGROUND

1. Field

The subject matter disclosed herein relates to electronic devices, and more particularly to methods and apparatuses for use in and/or with a device capable of providing or otherwise supporting position, velocity, and/or time estimations.

2. Information

Wireless communication systems are fast becoming one of the most prevalent technologies in the digital information arena. Satellite and cellular telephone services and other like wireless communication networks may already span the entire globe. Additionally, new wireless systems (e.g., networks) of various types and sizes are added each day to provide connectivity among a plethora of devices, both fixed and portable. Many of these wireless systems are coupled together through other communication systems and resources to promote even more communication and sharing of information.

Another popular and increasingly important wireless technology includes navigation systems and in particular satellite positioning systems (SPS) such as, for example, the global positioning system (GPS) and other like Global Navigation Satellite Systems (GNSS). SPS enabled devices, for example, may receive wireless SPS signals that are transmitted by orbiting satellites of a GNSS and/or other ground based transmitting devices. The received SPS signals may, for example, be processed to determine a global time, a range or pseudorange, an approximate or accurate geographical location, altitude, and/or speed of the SPS enabled device. Consequently, various position and/or velocity estimation processes may be supported, at least in part, using an SPS enabled device.

SPS position tracking in certain environments, such as, "urban canyons" and the like, may become difficult as a result of SPS signals being reflected by objects and arriving over multiple paths at the receiver. Such multipath and other like signals may interfere with signals that travel along a line-of-sight (LOS) path from a transmitter, which may lead to position/velocity/time measurement errors. For example, such errors, when presented in a least-squares, Kalman filter (KF), and/or other like positioning process associated with a position/velocity/time estimation process, may lead to substantial position/velocity/time errors. By way of example, some pseudorange (PR) and/or pseudorange rate (PRR) measurement errors may lead to estimated position errors on the order of tens to hundreds of meters. It may be useful, therefore, to reduce or eliminate such errors at times.

SUMMARY

In accordance with certain aspects, various methods are provided which may be implemented with or in one or more electronic devices to determine whether an initial measurement for use in a position/velocity/time estimation filter (e.g., a Kalman filter, etc.) may be "suspect" based, at least in part, on one or more thresholds. For example, an initial measurement may be considered suspect it has a measurement innovation that fails to satisfy one more threshold values. If an initial measurement is determined to be suspect, then a validated measurement may be selectively established, for example, by operatively re-weighting the suspect measurement in some manner or operatively one-sided isolating the suspect measurement.

By way of example, in certain implementations an initial measurement may be associated with at least a first signal from at least one of a Satellite Positioning System (SPS), a Space Vehicle (SV), a Global Navigation Satellite System (GNSS), a Ground based transmitter (GBT), one or more position/velocity/time related sensor(s), and/or the like (where the phrase position/velocity/time related sensor(s) refers to one or more sensors to sense position, velocity, and/or time). In certain implementations, for example, an initial measurement may be associated with a signal strength of such first signal; a type of such first signal; a source of such first signal, etc. In certain implementations, an initial measurement may be associated with a pseudorange (PR) measurement or a pseudorange rate (PRR) measurement as may be determined, for example, based at least in part using such first signal.

To determine whether an initial measurement may be suspect, for example, a predicted measurement for a first signal may be determined using the position/velocity/time estimation filter (to filter position, velocity, and/or time), and then a measurement innovation may be determined based, at least in part, on such predicted measurement and the initial measurement. It may then be determined whether the initial measurement is suspect based, at least in part, on such measurement innovation. In certain example implementations, a measurement innovation may be determined based, at least in part, on a time updated state of the position/velocity/time estimation filter and/or at least one trial state of the position/velocity/time estimation filter.

In certain example implementations, a validated measurement may comprise an operatively deweighted measurement or an operatively one-sided deweighted measurement as a result of operatively re-weighting an initial measurement. Here, for example, the position/velocity/time estimation filter may be used in determining an estimated position/velocity/time based, at least in part, on a plurality of measurements in a measurement set, wherein the plurality of measurements includes such validated measurement.

In certain example implementations, a validated measurement may comprise an operatively one-sided isolated measurement as a result of operatively one-sided isolating the initial measurement. Here, for example, the position/velocity/time estimation filter may be used in determining an estimated position/velocity/time based, at least in part, on a plurality of measurements in a measurement set, but wherein the plurality of measurements does not include such one-sided isolated measurement.

In certain example implementations, if at least one other initial measurement is determined to be suspect, then such other initial measurement may be operatively isolated (e.g., provided that a minimum number of measurements remain available).

In accordance with certain aspects, an apparatus may be provided which, for example, comprises means for determining whether an initial measurement for use in a means for estimating position/velocity/time is suspect based, at least in part, on at least one threshold, and means for selectively establishing a validated measurement, if the initial measurement is determined to be suspect, by either: (1) operatively re-weighting the initial measurement and/or (2) operatively one-sided isolating the initial measurement.

In accordance with certain aspects, an apparatus may be provided which, for example, comprises memory capable of storing a measurement set associated with a plurality of position/velocity/time related signals, and at least one processing unit coupled to the memory to determine whether the initial measurement is suspect based, at least in part, on at least one threshold, if the initial measurement is determined to be suspect, selectively establish a validated measurement by either: (1) operatively re-weighting the initial measurement; and/or (2) operatively one-sided isolating the initial measurement, and provide the validated measurement to the memory for storage in the measurement set and subsequent use in the position/velocity/time estimation filter.

In accordance with certain aspects, an article of manufacture may be provided which, for example, comprises a computer readable medium having computer implementable instructions stored thereon which if implemented by one or more processing units in an electronic device enable the electronic device to: determine whether an initial measurement for use in a position/velocity/time estimation filter is suspect based, at least in part, on at least one threshold; and if the initial measurement is determined to be suspect, then selectively establish a validated measurement by either: (1) operatively re-weighting the initial measurement; and/or (2) operatively one-sided isolating the initial measurement.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Methods and apparatuses are provided that may be implemented in various electronic devices to identify suspect measurements for use in a position/velocity/time estimation filter and provide corresponding validated measurements that may be either operatively re-weighted in some manner or operatively one-sided isolated in some manner when subsequently considered by the position/velocity/time estimation filter.

Some example, methods and apparatuses are described herein which may be implemented in one or more devices to "validate" one or more measurements associated with a position, velocity, and/or time ("position/velocity/time") estimation capability. In certain example implementations, a validation process may identify suspect measurements, and selectively (operatively) one-sided isolate or otherwise modify the suspect measurement in some manner. With such a validated measurement within the measurement set, a resulting estimated position/velocity/time may be more accurate and/or reliable.

By way of example but not limitation, a measurement associated with an SPS signal may have been significantly affected by multipath propagation and/or other like interfering signals. In certain instances, for example, a validation process may be enabled to identify such a suspect measurement and to isolate the measurement in some manner that the suspect measurement is not used while estimating a subsequent position/velocity/time. In certain instances, for example, a validation process may be enabled to identify such a suspect measurement and to modify the measurement in some manner such that the suspect measurement will be used in estimating a subsequent position/velocity/time, its influence on the position/velocity/time estimation is reduced. Here, for example, a suspect measurement may be selectively (operatively) re-weighted or otherwise modified within the measurement set and included in a plurality of measurements therein which may be used to estimate position/velocity/time.

Thus, in accordance with certain aspects of the present description, several methods and apparatuses are presented which may be implemented in various ways to reduce and/or eliminate the effect that certain SPS signal related measurement errors may introduce to navigation or other like processes. As described herein, several example implementations are presented which employ techniques that may identify a suspect SPS signal related measurement and selectively "one-sided isolate" or possibly change the weighting associated with such identified suspect measurement.

By way of further example but not limitation, as described herein, several example implementations are presented which may be used to identify which SPS signal related measurements are most likely to be in error, and which should be re-weighted, or one-sided isolated from use in an estimated position/velocity/time solution calculation.

In certain example implementations, before a new estimated position/velocity/time solution calculation is performed, all or part of a measurement set comprising SPS signal related measurement information may be analyzed. For example, all or part of a measurement set comprising SPS signal related measurement information may be analyzed as part of a validation process to determine whether there is excess or possibly redundant measurement information, and if so, whether certain measurement information is (operatively) isolated as being suspect for some reason. For example, a validation process may determine that certain excess or possibly redundant measurement information may be isolated if determined to be too unreliable for various reasons. Here, for example, certain excess or possibly redundant measurement information may be ignored if related to SPS signals having a signal strength (as received) which fails to satisfy a threshold signal strength level.

In some example implementations, certain excess or possibly redundant measurement information may be isolated by a validation process if related to SPS signals transmitted from certain "space vehicles" (SVs). Here, for example, certain types of ground-based SVs may be determined to be less desirable than other types of SVs, e.g., due to a higher potential for multipath interference, etc.

In certain example implementations, all or some of the measurement information may be compared and/or cross-checked with other measurement information during a validation process. By way of example, measurement information may be cross-checked with estimated measurement information associated with or established by a position/velocity/time estimation filter that supports the position/velocity/time estimation calculation. For example, a Kalman filter (KF) or other like function/process/circuit may be used to establish/maintain a state that is used to estimate measurement information and/or estimate a position/velocity/time based, at least in part, on a plurality of measurements in a measurement set (e.g., wherein the plurality of measurements does not include any operatively isolated measurements, but may include one or more operatively re-weighted measurements and/or one or more initial measurements). Thus, a validation process may, for example, selectively deweight or possibly one-sided isolate measurements that are inconsistent with certain estimates.

In some instances, a validation process may determine that a measurement that is inconsistent with certain estimated measurements should nonetheless not be isolated or re-weighted. For example, as described in greater detail herein, in certain example implementations a validation process may employ one-sided isolation (e.g., in the form of one-sided deweighting with different thresholds for positive and negative residuals) which may align better with an actual observed error distribution than a more typical two-sided, often Gaussian, error distribution assumption. For example, one-sided deweighting may be implemented such that measurement information associated with less common negative (short) PR residuals are not deweighted as much as the measurement information associated with more common positive (long) PR residuals.

In certain example implementations, as described in greater detail herein, a validation process may employ certain cross-checking and/or other like determination processes which use initial measurement information and time-updated KF or other like state information simultaneously. For example, such cross-checking and/or other like determination processes may be iteratively performed by selectively adding or removing certain measurement information from an updated KF or other like state. Other example implementations are also described in greater detail herein, by way of example but not limitation.

In certain example implementations, a validation process may employ certain cross-checking and/or other like determination processes which may compare measurement innovations, such as, for example, innovations associated with PR residuals, PRR residuals, and/or the like. In certain example implementations, certain measurement information may be associated with received Doppler velocity and/or carrier phase portion of an SPS signal. For example, PRR measurement information may be derived from a Doppler velocity and/or carrier phase of an SPS signal. Such measurement information may, for example, be analyzed as part of a validation process to determine whether an aggressive (low) set of error estimates are consistent, and if not, or if not enough information is available for cross-checking and/or other like determination processes, then more conservative (high) error estimates may be used instead in the resulting measurement set.

Also as described in greater detail in subsequent sections, as used herein an SPS may include a variety of like or different types of systems, devices, processes, etc., that are capable in providing and/or otherwise supporting in some manner a position/velocity/time estimation process. By way of example but not limitation, in certain example implementations an SPS may include one or more global navigation satellite systems (GNSS), such as, the global positioning system (GPS) having a plurality of SVs, and/or one or more ground based transmitters, networks, or devices such as a cellular base station, which transmit signals that may, for example, be used for AFLT techniques known in the art of Mobile Station (MS) positioning.

As used herein, a position/velocity/time estimation process may include any process in which a device may be involved, that in some manner is based, at least in part, on SPS related information associated with at least one SPS signal acquired by an SPS receiver in the device and/or a SPS receiver coupled to but external to the device. In certain example implementations, a position/velocity/time estimation process may include a position/navigation capability that is provided by a device based on locally maintained measurement information. In certain other example implementations, a position/velocity/time estimation process may include a position/navigation capability that is provided in part by one or more other devices with assistance from the host device based, at least in part, on SPS related information that is communicated between the host device and the one or more other devices.

Figure 1:
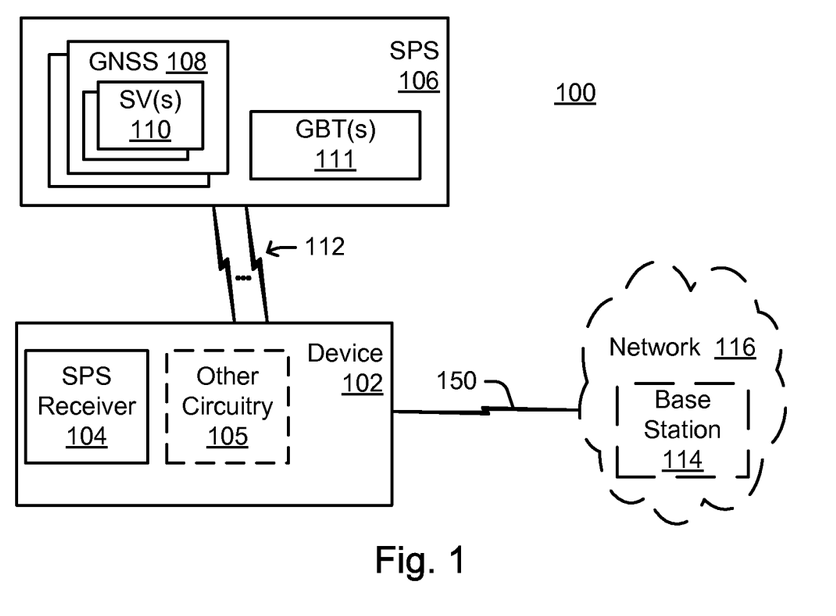
FIG. 1 is a schematic block diagram illustrating an exemplary signaling environment that includes at least one device capable of supporting, at least in part, one or more position, velocity, and/or time estimation processes based, at least in part, on one or more transmitted and received SPS signals, in accordance with an implementation.

Reference is now made to FIG. 1, which is a schematic block diagram illustrating an exemplary signaling environment 100 that includes at least one device 102 capable of supporting, at least in part, one or more position/velocity/time estimation processes based, at least in part, on one or more transmitted and received SPS signals, in accordance with an example implementation.

Environment 100 may include various computing and communication resources capable of providing at least some form of a position/velocity/time estimation process with regard to device 102 based, at least in part, on one or more SPS signals 112 from an SPS 106. Device 102 is representative, therefore, of an electronic device that is capable of performing with or without assistance a position/velocity/time estimation process based at least in part on SPS signals. Accordingly, device 102 may include an SPS receiver 104. Thus, for example, device 102 may take the form of a stand-alone navigation circuit or device in certain implementations. In other implementations, as illustrated in the example shown in FIG. 1, device 102 may include other circuitry 105 and/or the like which enables device 102 to perform and/or support other processes. By way of example but not limitation, device 102 may take the form of a mobile or portable computing device or machine that may also be capable of communicating with one or more resources within a wireless/wired communication network 116 over one or more wireless/wired communication links 150 coupled to a base station 114 or other like access point. Thus, for example, device 102 may include a mobile station such as a cellular phone, a smart phone, a personal digital assistant, a portable computing device, a navigation unit, and/or the like or any combination thereof. In other example implementations, device 102 may take the form of one or more integrated circuits, circuit boards, and/or the like that may be operatively enabled for use in another device.

Device 102 may, for example, be enabled for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example.

As illustrated in the example in FIG. 1, SPS 106 may, for example, include one or more GNSS 108, each of which may include a different plurality of SVs 110 that may transmit different SPS signals 112. As illustrated, SPS 106 may, for example, include one or more pseudolites 111 and/or other like transmitting devices that may transmit certain SPS signals 112.

Techniques described herein may be used with an "SPS" that includes any one of several GNSS and/or combinations of GNSS. Furthermore, such techniques may be used with positioning systems that utilize ground based transmitters (GBTs) or a combination of SVs and GBTs. GBTs 111 may, for example, include many of the wireless network transmitters described above (802.11b, WWAN/cellular (UMTS/cdma2000/etc, TV towers, pseudolites, etc) that a signal that can be measured in some fashion, such as identifying timing information that can be converted to a PR or PRR measurement, and/or signal strength, as examples of measurements. Such a transmitter may be a locally uniquely identifiable signal so as to permit identification by a remote receiver. GBTs may be useful, for example, to augment an SPS in situations where SPS signals from an orbiting SV might be unavailable, such as in tunnels, mines, buildings, urban canyons or other enclosed areas. Another implementation of GBTs is known as radio-beacons. The term "SV", as used herein, is intended to include GBTs, equivalents of GBTs, and possibly others. The terms "SPS signals" and/or "SV signals", as used herein, is intended to include signals from GBTs or equivalents of GBTs.

With this in mind and in accordance with certain aspects, some exemplary methods and apparatuses will now be described, which may be implemented in whole or part in one or more devices, such as electronic device 102, to support, at least in part, one or more position/velocity/time estimation processes based, at least in part, on one or more transmitted and received SPS signals. By way of example, one or more devices 102 may include dedicated and/or special-purpose programmed circuitry capable of providing a measurement validation process as part of and/or otherwise supporting a position/velocity/time estimation process.

Figure 2:
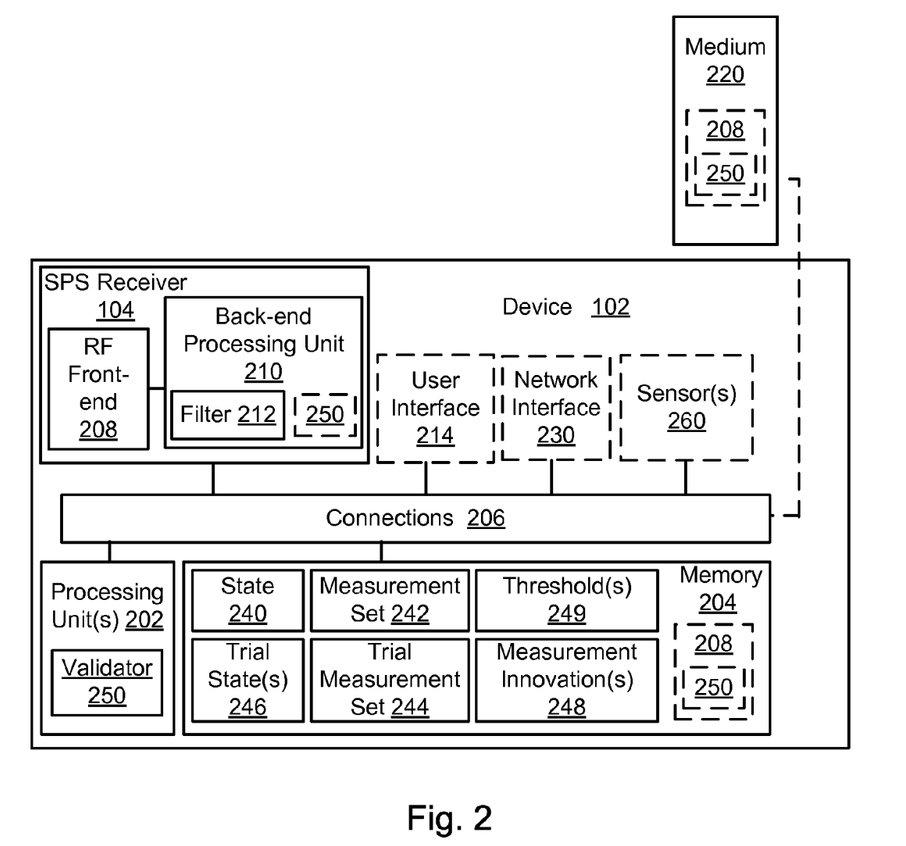
FIG. 2 is a schematic block diagram illustrating certain features of an exemplary device, for example as in FIG. 1, capable of providing a measurement validation process within and/or otherwise supporting a position/velocity/time estimation process, in accordance with an implementation.

As illustrated in the exemplary schematic block diagram of FIG. 2, in certain example implementations, device 102 may include an SPS receiver 104 capable of receiving an RF signal that includes at least one SPS signal 112. SPS receiver 104 may include, for example, an RF front-end circuit 208 coupled to a back-end processing unit 210. RF front-end circuit 208 may, for example, provide one or more electronic signals representing one or more SPS signals as received. In certain implementations, back-end processing unit 210 may use the one or more electronic signals from RF front-end circuit 208 to establish one or more measurements of measurement set 242. As illustrated in this example, back-end processing unit 212 may include or otherwise operatively implement, in whole or part, a position/velocity/time estimation or other like filter 212. By way of example, filter 212 may include a Kalman filter and/or the like which is capable of supporting a position/velocity/time estimation process based, at least in part, on at least a portion of measurements in a measurement set 242. In certain other example implementations, all of part of filter 212 may be implemented in other circuits within device 102.

In certain example implementations, SPS receiver 104 may provide one or more electronic signals representing one or more measurements of measurement set 242, shown here as stored in memory 204. In certain example implementations, one or more processing units 202 may be coupled to SPS receiver 104 and provide one or more electronic signals representing one or more measurements of measurement set 242. In certain example implementations, one or more position-related sensors 260 may be coupled to processing units 202 and/or memory 204 and provide one or more electronic signals representing one or more measurements of measurement set 242. By way of example but not limitation, a position-related sensor 260 may include one or more of an accelerometer, a gyroscope, a compass or other like magnetometer, a barometric or other like altimeter, etc., or combination thereof which may provide one or more measurements which are useful in estimating position/velocity/time.

In certain example implementations, SPS receiver 104 and/or processing unit(s) 202 may be enabled to exchange one or more electronic signals representing all or part of measurement set 242 with memory 204 (e.g., via one or more connections 206).

In certain example implementations, one or more of the example circuits illustrated within device 102 may be operatively responsive to, or otherwise affected in some manner by, computer implementable instructions 208, which may be stored in memory 204. Thus, for example, at least a portion of the computer implementable instructions 208 may be implemented by processing unit(s) 202, back-end processing unit 210, filter 212, sensor 260, network interface 230, etc., to provide or otherwise operatively support in some manner a validation process represented by a validator 250. By way of example but not limitation, as illustrated in FIG. 2, validator 250 may be provided in whole or part by processing unit(s) 202, and/or back-end processing unit 210. It should be recognized that in certain implementations, one or more of processing unit(s) 202 and back-end processing unit 210 may comprise the same or some common circuitry.

As illustrated in FIG. 2 an article of manufacture represented here by a computer readable medium 220 may be provided and accessed by processing unit(s) 202, for example. As such, in certain example implementations, the methods and/or apparatuses may take the form in whole or part of a computer readable medium 220 that may include computer implementable instructions 208 stored thereon, which if executed by at least one processing unit or other like circuitry are enabled to enable the processing unit(s) 202 and/or the other like circuitry to perform all or portions of validator 250 and/or supporting techniques/processes as presented in the examples herein.

Processing unit(s) 202 may be implemented in hardware or a combination of hardware and software. Processing unit(s) 202 may be representative of one or more circuits configurable to perform at least a portion of a data computing procedure or process. By way of example but not limitation, processing unit(s) 202 may include one or more processors, controllers, microprocessors, microcontrollers, application specific integrated circuits, digital signal processors, programmable logic devices, field programmable gate arrays, and the like, or any combination thereof.

Memory 204 may be representative of any data storage mechanism. Memory 204 may include, for example, a primary memory and/or a secondary memory. Primary memory may include, for example, a random access memory, read only memory, etc. While illustrated in this example as being separate from processing unit(s) 202, it should be understood that all or part of a primary memory may be provided within or otherwise co-located/coupled with processing unit(s) 202, SPS receiver 104, back-end processing unit 210, etc. Secondary memory may include, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, computer readable medium 220.

As illustrated in FIG. 2, in addition to measurement set 242, in support of validator 250 and/or filter 212, memory 204 may also store one or more electronic signals representing a state 240, one or more trial measurement sets 244, one or more trial states 246, one or more thresholds 249, and/or one or more measurement innovations 248.

State 240 may, for example, be associated with filter 212 and updated by filter 212 based, at least in part, on at least a portion of measurement set 242. For example, in certain implementations a state 240 may include information associated with an existing state of as determined by or otherwise associated with a Kalman filter.

As described in greater detail in other sections herein, validator 250 may, for example, establish one or more trial measurement sets 244 based, at least in part, on one or more initial measurements in measurement set 242. For example, validator 250 may copy all or part of measurement set 242 and selectively isolate one or more suspect measurements therein to temporarily create a trial measurement set 244 without such suspect measurement(s). For example, validator 250 may copy all or part of measurement set 242 and selectively re-weight one or more suspect measurements therein to temporarily create a trial measurement set 244 with certain re-weighted measurement(s). Thus, a trial measurement set 244 may include a combination of isolated measurement(s), re-weighted measurement(s), and/or initial measurements of measurement set 242.

Validator 250 and/or filter 212 may, for example, establish one or more trial states 246 based, at least in part, on a portion of measurement set 242 and/or a portion of one or more trial measurement sets 244. A trial state 246 may, for example, be established by a Kalman filter based, at least in part, on propagating position/velocity/time information forward in time (time updated) starting with existing state 240.

Validator 250 and/or filter 212 may, for example, establish one or more measurement innovations 248 based, at least in part, on measurements from one or more of measurement set 242 and/or one or more trial measurement sets 244. For example, a Kalman filter may be used to establish a measurement innovation based, at least in part, on a measurement in either measurement set 242 or a trial measurement set 244 compared to a corresponding predicted measurement associated with either state 240 and/or a trial state 246.

Validator 250 may, for example, establish one or more thresholds 249. For example, validator 250 may establish one or more of thresholds 249 based on probabilistic and/or other like determinations associated with a given source, signal, measurement, and/or other like determined information that may be related in some manner to the reliability/unreliability of a measurement of measurement set 242. In certain implementations, one or more of thresholds 249 may be predefined, and/or adaptive in some manner, for example, via instructions 250. Validator 250 may, for example, determine whether one or more measurements within one or more of measurement set 242 and/or one or more trial measurement sets 244 may be deemed to be suspect based, at least in part, on one or more of thresholds 249. For example, validator 250 may compare a measurement, a measurement innovation, and/or the like to a corresponding threshold to possibly identify a measurement as being suspect.

As further illustrated in FIG. 2, device 102 may include one or more connections 206 (e.g., buses, lines, conductors, fibers, etc.) to operatively couple the various circuits together and carry one or more electronic signals there between, and a user interface 214 (e.g., display, touch screen, keypad, buttons, knobs, microphone, speaker, etc.) to receive user input and/or provide information to the user. Device 102 may include a network interface 230 (e.g., wireless transceiver, modem, antenna, etc.) to allow for communication with one or more other devices over a communication link (e.g., link 150 in FIG. 1).

Figure 3:
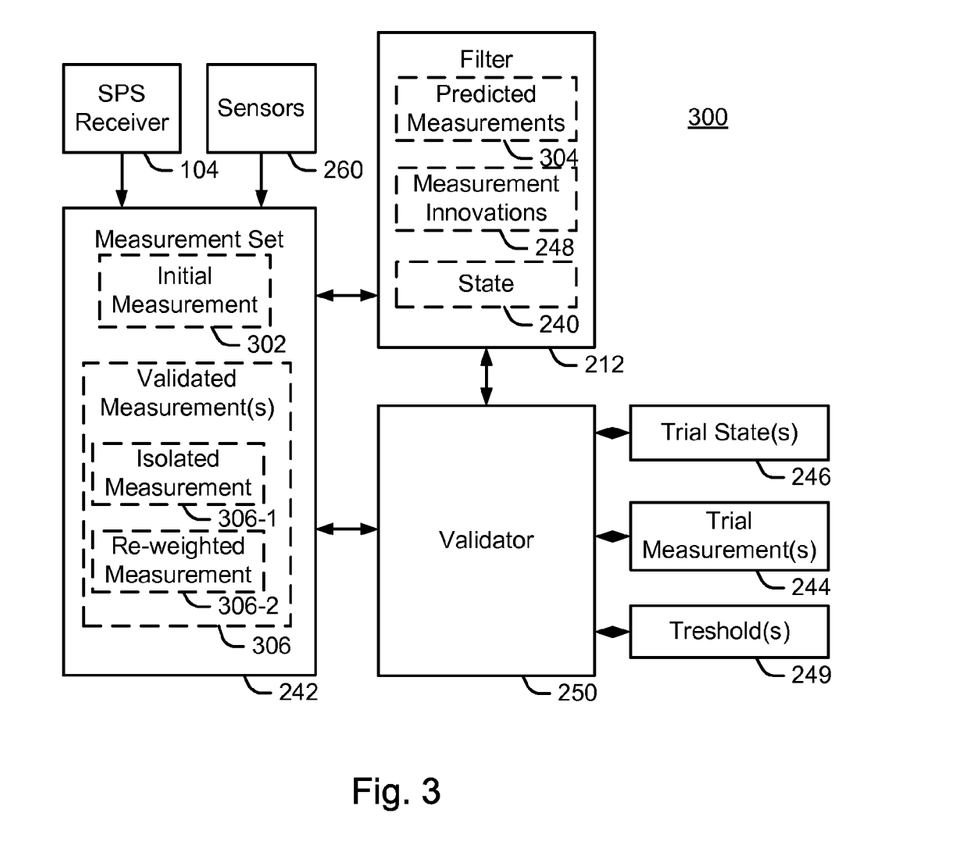
FIG. 3 is a functional block diagram illustrating certain features of an exemplary process that may be implemented in whole or part in a device, for example as in FIG. 2, capable of generating and storing one or more electronic signals representing one or more validated measurements within a measurement set, in accordance with an implementation.

Reference is made next to FIG. 3 with the examples of FIGS. 1 and 2 in mind FIG. 3 is a functional block diagram illustrating certain features of an exemplary process 300 capable of generating and storing one or more electronic signals representing one or more validated measurements 306 within a measurement set 242, in accordance with an implementation.

As illustrated in FIG. 3, measurement set 242 may include one or more initial measurements 302, for example, as may be associated with SPS receiver 104 and/or one or more sensor(s) 260. Measurement set 242 may also include one or more validated measurements 306, such as one or more isolated measurements 306-1, and/or one or more re-weighted measurements 306-2. Validated measurements 306 may be provided by validator 250 and may be established based, at least in part, on one or more of initial measurements 302, predicted measurements 304, measurement innovations 248, state 240, trial state(s) 246, trial measurement(s) 244, and/or threshold(s) 249.

In this illustrated example, filter 212 is shown as establishing state 240, predicted measurements 304, and measurement innovations 248. In certain implementations, filter 212 may also establish trial states 246 based, at least in part, on trial measurements 244. Trial measurements 244 may be established by validator 250 and may include various implementations of validated and initial measurements. As described in greater detail herein, validator 250 may be implemented in a variety of ways to identify suspect measurements and revise measurement set 242 in some manner, e.g., with validated measurements, to allow subsequent position/velocity/time estimation calculations to be less affected by suspect measurements.

Figure 4:
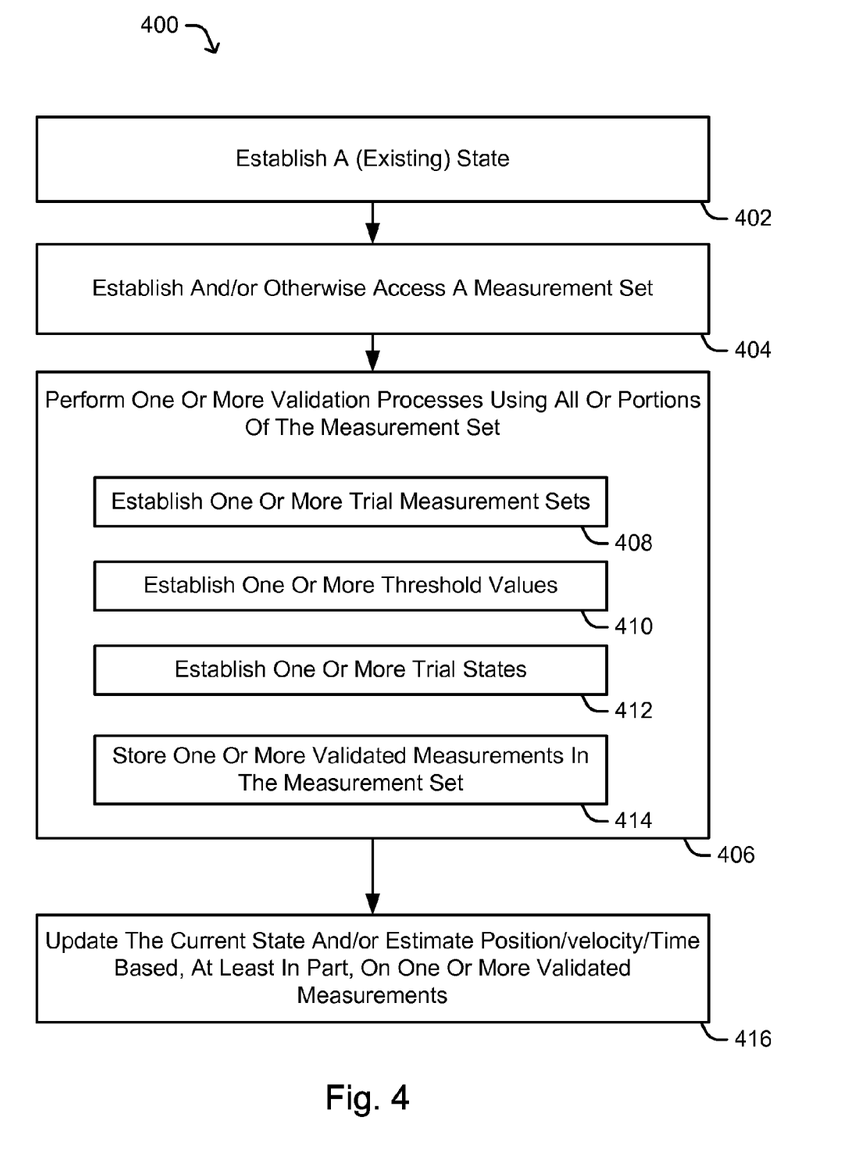
FIG. 4 is a flow diagram illustrating an example process that may be implemented in whole or part in a device, for example as in FIG. 2 to generate and store one or more electronic signals representing at least a portion of an estimated position/velocity/time based, at least in part, on a plurality of measurements in a measurement set, in accordance with an implementation.

Reference is made next to FIG. 4, which is a flow diagram illustrating an example process 400 that may be implemented in whole or part in device 102 (see, e.g., FIGS. 1 and 2) to generate and store one or more electronic signals representing at least a portion of an estimated position/velocity/time based, at least in part, on a measurement set comprising one or more validated measurements, in accordance with an implementation.

At block 402, a state may be established. For example, a Kalman filter and/or the like, may be employed to establish an existing state based, at least in part, on a plurality of measurements in a measurement set. As previously described, such measurements may be associated with an SPS and/or one or more sensors.

At block 404, a measurement set may be established and/or otherwise accessed. Here, for example, (new) initial measurements may be made by an SPS receiver and/or one or more sensors and one or more electronic signals representing such measurements may be stored in memory.

At block 406, one or more validation processes may be performed using one or more measurements of the measurement set. Thus, for example, at block 408, one or more trial measurement sets may be established based, at least in part, on one or more initial measurements. A trial measurement set may, for example, include one or more validated measurements, such as, a one-sided isolated measurement, or a re-weighted measurement. A trial measurement set may, for example, include one or more, or possibly none, of the initial measurements. A trial measurement set, in certain implementations, may include the same number of measurements or possibly fewer measurements than does the measurement set established at block 404.

At block 410, one or more threshold values may be established or otherwise accessed. Here, for example, a threshold value may be established which identifies a desired signal strength level below which a measurement of signal strength may be determined to be suspect and potentially isolated or re-weighted (e.g., here, deweighted). In certain example implementations, a threshold value may be established which identifies certain measurements by type, source, or other like identifying manner, such that a measurement may be determined to be suspect and potentially isolated or re-weighted (e.g., here, deweighted) if determined to be of such type, from such source, or in some other manner matches the threshold value. In still other example implementations, a threshold value may be established which identifies a desired measurement innovation, and/or other like error or uncertainty measurement above/below which such a measurement may be determined to be suspect and potentially one-sided isolated or re-weighted (e.g., here, deweighted). Therefore, the threshold value(s), at block 410, may take on various forms, such as, for example, numerical values, identifier values, functional value (e.g., a probabilistic-based function or parameter, or the like), and/or the like.

At block 412, one or more trial states may be established. For example, a trial state may be established based, at least in part, on one or more measurements from a trial measurement set (or initial measurement set) established at block 408. Here, for example, a Kalman filter may use an existing state and at least a portion of a trial measurement set to establish one or more electronic signals representing a resulting trial state. In this manner, a validation process may analyze and/or otherwise compare the outcome from various trial measurement sets with different validated measurements in an attempt to meet a specific performance threshold value, and/or refine the measured set prior to calculating updated (current) estimated position/velocity/time information. In accordance with certain aspects, the term "state" may include a set of information, such as position, velocity, time, or other like information, from which, at least in part, an estimated measurement may be derived or otherwise determined. An example, not exclusive, of a state is a Kalman Filter state, including three-dimensions of position information.

At block 414, one or more validated measurements from the trial measurement set at block 408 may selectively be stored in the measurement set. Thus, for example, one or more initial measurements of the measurement set at block 404 may be replaced and/or otherwise modified in some manner based on one or more corresponding validated measurements of a trial measurement set. Thus, at block 406, the one or more validation processes may be implemented to identify suspect measurements and test potential isolation, one-sided isolation, and/or some form of re-weighting thereof which may improve a subsequent estimated position/velocity/time calculation.

At block 416, the state from block 402 may be updated and/or estimated position/velocity/time information may be calculated based, at least in part, on the resulting measurement set, which may include one or more validated measurements.

In the above examples, validator 250 and/or related validation processes 300 and 400 may be implemented in a variety of different manners. Some non-limiting examples are summarized below to further illustrate some example implementation features.

In certain example implementations, a validation process may include the selective isolation of one or more measurements based, at least in part, on a corresponding measurement innovation, and/or other signal related parameters (e.g., signal strength, source, type, etc.). With regard to at least a measurement innovation decision process, such selective isolation technique may be applied, for example, to PR and PRR measurements associated with SPS signals. Here, for example, the measurement innovation may be based, at least in part, on a comparison of a (new) initial measurement and a corresponding predicted measurement value (e.g., time updated as propagated based on an existing state). Thus, in certain implementations, such measurement innovation may be associated with a PR measurement based on code phase or carrier phase, a PRR measurement based upon Doppler velocity (energy), frequency-lock-loop, or carrier phase measurement, and/or possibly other positioning measurements (e.g., associated with one or more sensors). Accordingly, an example selective isolation technique may determine to isolate at least one measurement in a measurement set based, at least in part, on a measurement innovation associated with a position/velocity/time estimation filter. Here, for example, as previously described one or more predefined threshold values (e.g., static, programmed, etc.), one or more adaptive threshold values, and/or one or more sigma-based or other like determined probabilistic-based threshold values (e.g., probabilistic, dynamic, etc.) may be used in the decision process.

Similarly, in certain example implementations, a validation process may include the selective re-weighting of one or more measurements based, at least in part, on a corresponding measurement innovation. Such selective re-weighting technique may also be applied, for example, to PR and PRR measurements associated with SPS signals and/or other positioning measurements (e.g., associated with one or more sensors).

Still further, in certain example implementations, a validation process may include the selective one-sided deweighting of one or more measurements based, at least in part, on a corresponding measurement innovation value. Such selective one-sided deweighting technique may be applied, for example, to PR measurements associated with SPS signals. As previously described, a one-sided deweighting process may differently deweight a measurement if it is determined that the associated measurement innovation is "positive" (e.g., inferring that the transmission time/distance was longer than predicted) than if the residual is "negative" (e.g., inferring that the transmission time/distance was shorter than expected, possibly even inferring that the transmission time was shorter than appears physically possible based upon the estimated state and estimated measurement). Thus, as a result of such a one-sided deweighting process, in certain implementations a positive PR residual of the same magnitude of as a negative PR residual may be given less weight in a subsequent position/velocity/time estimation calculation solution.

One or more of the preceding example isolation and/or deweighting techniques may be implemented in a variety of ways, of which several non-limiting examples are described in greater detail below. For example, in certain implementations a measurement innovation check may be implemented in which, before updating a state with any of the measurements, a comparison of the state versus each measurement may be made and based, at least in part thereon, an assessment of the corresponding measurement may be established (e.g., to determine whether a measurement may be suspect). In another example implementation, a concurrent measurement innovation check may be implemented in which, all or significant portions of the measurements may be used to update the state, and then the resulting measurement innovations may be considered and validated measurements may be established to selectively re-weight (e.g., increase or decrease) the influence that certain measurements might have on a subsequent position/velocity/time estimation calculation. Thus, for example, a validation process may establish an updated state (e.g., to estimate position/velocity/time), take each measurement and check its residual with respect to the updated state, select a threshold with which to decide if a measurement is suspect and if so whether the measurement should be isolated or re-weighted, and based on this decision go back an iterate through the process again. Some further example implementations of a concurrent process are described in greater detail below.

In certain example implementations, in a related approach a validation process may attempt to rely on an aggressive (low) uncertainty of a plurality of measurements, for example, to establish a trial measurement set and trial state. Here, for example, such process may use a subset of measurements each of which has a relatively low uncertainty (with corresponding high weighting). It may then be determined based, at least in part, on the resulting measurement innovation whether the resulting error estimates are acceptable (again, e.g., based on one or more thresholds). If such error estimates are acceptable, then the trial state may become the updated (existing) state.

In other example implementations, a validation process may be implemented which employs various sequential measurement updates and sequential decisions processes. Here, for example, a validation process may separately apply each (new) initial measurement to produce a predicted trial state and decide whether the latest applied measurement is suspect or not, e.g., based at least in part on a resulting measurement innovation. If desired, a validated measurement may be operatively isolated or re-weighted. Such sequential process may then continue to update a trial state for each measurement in the measurement set and make similar decisions.

With the above summarized examples in mind, some additional implementation details and examples will now be described in greater detail with regard to a Kalman filter (KF) example implementation. As with the other examples provided herein, the following examples are intended to be non-limiting with regard to claimed subject matter.

In certain example implementations, a KF state update may employ an "Innovation-Sigma" technique. Here, for example, during a KF state update (e.g., at block 402 in FIG. 4), a measurement (e.g., initial PR or PRR measurement) may be determined to have M-sigma of innovation. Such M may, for example, be calculated as follows:

$$M_i = \Delta z_i / \text{sqrt}(H_i P H_i^T + R_i)$$

where $$\Delta z_i = z_i - \hat{z}_i$$

$z_i$ is the i'th measurement $R_i$ is the squared uncertainty (estimated variance) of the i'th measurement $$\hat{z}_i = H_i x$$

$H_i$ is the geometry matrix (direction cosine) for the i'th measurement, and x is the KF state, and P is the covariance matrix of the KF state, and $H_i P H_i^T$ is the squared uncertainty (estimated variance) for the predicted measurement, and $(H_i P H_i^T + R_i)$ is the squared uncertainty (estimated variance) for the difference between the predicted measurement and observed measurement, In certain example implementations, (new) initial SPS measurements may be checked against each other and the KF state to test their validity for possible isolation and/or deweighting decisions. In certain example implementations, for example, PR's may be operatively included in a KF trial state sequentially, e.g., starting from the PR with a lower uncertainty. As such measurements are added sequentially, this means that the i'th PR to be included may be checked against the information in the KF state, and the i−1 PR's previously added to the state.

Here, for example, with each potential addition of PR information to the KF state, the innovation_sigma ($M_i$) may be calculated. By way of example but not limitation, in certain implementations if $M_i$ is greater than a threshold value of (absolute magnitude) of five, it may be deemed suspect and isolated so as to not be used to update the KF state. If $M_i$ is greater than a threshold value of (absolute magnitude) of three, it may be deemed suspect and deweighted, e.g., by multiplying the PR_Unc by two before applying the measurement to the KF state.

Re-weighting may be selectively applied, for example, in certain implementations deweighting may be done only if a measured_PR was determined to be longer than a state_predicted_PR ($\Delta z_i > 0$). Such technique is referred to herein as one-sided deweighting and may be useful for PRs, PRRs, and other like measurements. Here, for example, a deweighting threshold may be set at $M_i > 2$ for measurements having positive residuals, while for measurements having negative residuals deweighting may be set at $M_i > 3$ or may not even be employed. Thus, in accordance with certain aspects, different thresholds may be used for positive and negative residuals.

The use of innovation sigma ($M_i$) values may, more generally be used to re-weight measurements either to larger or smaller values. For example, if a set of measurements all have $M_i$ values (absolute) substantially smaller than 1, then a lower measurement uncertainty, and higher weight may be used.

In certain example implementations a technique referred to herein as concurrent RAIM may be implemented. Here, for example, a temporary copy (e.g., a trial state) of the KF state may be used. This temporary copy may be a time-updated version (e.g., predicted or propagated) of the KF state, for example. In such a trial state, all of the available SPS PR measurement information in a measurement block may be operatively included beginning with no PRRs, no isolation and no deweighting. Then, the resulting trial state may be compared to the measurement set to determine whether any of the measurements are large (isolatable) or small (deweightable) outliers as compared to the fully updated state. The innovation_sigma ($M_i$) may be calculated for each SV based upon the updated state, and all of the measurements sans the measurement itself. Some example techniques for doing this are described below by way of example but not limitation.

In certain example implementations, if any outliers are detected beyond a threshold limit, e.g., a five sigma limit, a worst one of such suspect measurements (e.g., having the highest absolute value of $M_i$) may be isolated, and the process may be repeated until no such suspect measurements are left to be isolated. At such a point, for example, the remaining measurements' innovation_sigma's ($M_i$'s), which may be calculated concurrently, may be used for the re-weighting math (e.g., multiplying PR_Unc by $M_i$ for longer-than-predicted PRs).

One possible example technique for implementing a validation process that includes innovation-sigma in concurrent KF RAIM is as follows. Here, for example, concurrent RAIM may use all SPS PR measurements to update the KF state, except the measurement to be tested, and then the innovation-sigma ($M_i$) for that last measurement may be calculated using the updated state.

Thus, for example, a temporary copy of the KF state may be created (e.g., a trial state). Then, all PR (or PRR) measurements, except for the i-th PR (or PRR) measurement may be operatively included in the KF state. This updated KF (trial) state may then be used to predict the i-th PR (or PRR) measurement, which may then be compared to an observed (initial) i-th PR (or PRR) measurement, to calculate a residual $R_i^-$ which may then be used to calculate the innovation sigma ($M_i$) for the i-th PR (or PRR) measurement. This process may be repeated N times, e.g., once for each measurement.

More specifically, an example validation process may:
1) Propagate the KF state to the time of the measurement block (time-update) as a baseline to be used below.
2) For each, i-th measurement, from 1 to N (where N is the number of PR measurements)
   a. Update the time-updated baseline KF state with all PR measurements except the i-th PR measurement.
   b. Calculate the innovation-sigma between the state and the i-th PR measurement, and save as $M_i$.
3) Use the $M_i$'s in a decisions to selectively isolate or deweight a corresponding measurement.

By way of example but not limitation, in certain implementations a validation process may implement isolation based, at least in part on $C/N_0$ comparisons. For example, in urban canyon or other like environments, SPS receivers may pick up weaker signals with especially large errors due to a longer integration process or higher multipath. When a number of likely large error measurements are used in a position calculation with a number of likely small error measurements the likely larger error measurements may reduce the accuracy performance of a positioning calculation such as a Kalman filter. One possible solution is to selectively isolate or possibly (significantly) de-weight a certain number of likely larger error measurements (e.g., those with a low carrier-to-noise ratio $C/N_0$), so to possibly improve the balance between the number of likely larger error measurements and likely smaller error measurements. By way of example but not limitation, in certain implementations, suspect measurements (e.g., based on low $C/N_0$) may be isolated or deweighted if a minimum number of measurements are available and usable (e.g., ephemeris is available) for a position/velocity/time calculation. Here, for example, such suspect measurements may be selectively isolated by removing those with lower $C/N_0$ if a minimum number of measurements are still available and usable after the isolation.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method of improving an estimated position/velocity/time calculation of a positioning device, comprising:
   determining, by the positioning device, whether one or more electronic signals representing an initial measurement for use in a position/velocity/time estimation filter is suspect based, at least in part, on one or more electronic signals representing at least one threshold;
   based on said initial measurement being determined to be suspect, establishing, by the positioning device, said initial measurement as one or more electronic signals representing a validated measurement by either: (1) re-weighting said initial measurement with a non-zero weight; and/or (2) one-sided isolating said initial measurement by one-sided de-weighting said initial measurement using different thresholds for positive and negative residuals; and
   storing an estimated position/velocity/time calculated or updated based on said validated measurement in a memory of the positioning device.

2. The method as recited in claim 1, wherein said initial measurement is associated with at least a first signal, said first signal being received from at least one of a Satellite Positioning System (SPS), a Space Vehicle (SV), a Global Navigation Satellite System (GNSS), a Ground based transmitter (GBT), or a position, velocity, and/or time related sensor.

3. The method as recited in claim 2, wherein said initial measurement is associated with at least one of: a signal strength of said first signal; a type of said first signal; a source of said first signal; a pseudorange (PR) measurement as determined based, at least in part, using said first signal; and/or, a pseudorange rate (PRR) measurement as determined based, at least in part, using said first signal.

4. The method as recited in claim 3, wherein said pseudorange rate (PRR) measurement is determined based, at least in part, using one or more electronic signals representing a Doppler velocity and/or carrier phase portion of said first signal.

5. The method as recited in claim 1, wherein said at least one threshold comprises at least one of one or more electronic signals representing a predetermined threshold value, one or more electronic signals representing an adaptive threshold value, and/or one or more electronic signals representing a determined probabilistic-based threshold value.

6. The method as recited in claim 1, wherein said position/velocity/time estimation filter comprises a Kalman filter.

7. The method as recited in claim 2, wherein determining whether said initial measurement is suspect comprises:
   determining one or more electronic signals representing a predicted measurement for said first signal using said position/velocity/time estimation filter;
   determining one or more electronic signals representing a measurement innovation based, at least in part, on said predicted measurement and said initial measurement; and
   determining whether said initial measurement is suspect based, at least in part, on said measurement innovation.

8. The method as recited in claim 7, wherein determining said measurement innovation further comprises:
   determining said measurement innovation based, at least in part, on one or more electronic signals representing at least one of a time updated state of said position/velocity/time estimation filter and/or at least one trial state of said position/velocity/time estimation filter.

9. The method as recited in claim 1, wherein said validated measurement comprises one or more electronic signals representing at least one of an operatively deweighted measurement or an operatively one-sided deweighted measurement as a result of operatively re-weighting said initial measurement, and further comprising:
   with said position/velocity/time estimation filter, determining one or more electronic signals representing at least one of an estimated position and/or an estimated velocity based, at least in part, on one or more electronic signals representing a plurality of measurements in a measurement set, said plurality of measurements comprising said validated measurement.

10. The method as recited in claim 1, wherein said validated measurement comprises one or more electronic signals representing an operatively one-sided isolated measurement as a result of operatively one-sided isolating said initial measurement, and further comprising:
    with said position/velocity/time estimation filter, determining one or more electronic signals representing at least one of an estimated position and/or an estimated velocity based, at least in part, on one or more electronic signals representing a plurality of measurements in a measurement set, but wherein said plurality of measurements do not comprise said operatively one-sided isolated measurement.

11. The method as recited in claim 1, further comprising:
    with said positioning device:
    based on at least one other initial measurement being determined to be suspect, operatively isolating said at least one other initial measurement by removing said at least one other initial measurement based on a minimum number of measurements remaining available.

12. An apparatus for improving an estimated position/velocity/time of a positioning device, comprising:
    means for determining whether an initial measurement for use in a means for estimating position/velocity/time of the positioning device is suspect based, at least in part, on at least one threshold;
    means for establishing said initial measurement as a validated measurement, based on said initial measurement being determined to be suspect, by either: (1) re-weighting said initial measurement with a non-zero weight and/or (2) one-sided isolating said initial measurement by one-sided de-weighting said initial measurement using different thresholds for positive and negative residuals; and means for storing an estimated position/velocity/time calculated or updated based on said validated measurement in a memory of the positioning device.

13. The apparatus as recited in claim 12, wherein said initial measurement is associated with at least a first signal, said first signal being received from at least one of a Satellite Positioning System (SPS), a Space Vehicle (SV), a Global Navigation Satellite System (GNSS), a Ground based transmitter (GBT), or a position, velocity, and/or time related sensor.

14. The apparatus as recited in claim 13, wherein said initial measurement is associated with at least one of: a signal strength of said first signal; a type of said first signal; a source of said first signal; a pseudorange (PR) measurement as determined based, at least in part, using said first signal based; and/or, a pseudorange rate (PRR) measurement as determined based, at least in part, using said first signal.

15. The apparatus as recited in claim 14, wherein said pseudorange rate (PRR) measurement is determined based, at least in part, using a Doppler velocity and/or carrier phase portion of said first signal.

16. The apparatus as recited in claim 12, wherein said at least one threshold comprises at least one of a predetermined threshold value, an adaptive threshold value, and/or a determined probabilistic-based threshold value.

17. The apparatus as recited in claim 12, further comprising:

means for determining at least one probabilistic-based threshold.

18. The apparatus as recited in claim 13, further comprising:

means for determining a predicted measurement for said first signal;

means for determining a measurement innovation based, at least in part, on said predicted measurement and said initial measurement; and means for determining whether said initial measurement is suspect based, at least in part, on said measurement innovation.

19. The apparatus as recited in claim 18, further comprising:

means for determining said measurement innovation based, at least in part, on at least one of a time updated state of said means for estimating position/velocity/time and/or at least one trial state of said means for estimating position/velocity/time.

20. The apparatus as recited in claim 12, wherein said validated measurement comprises at least one of an operatively deweighted measurement or an operatively one-sided deweighted measurement as a result of operatively re-weighting said initial measurement, and further comprising:

with said means for estimating position/velocity/time, determining at least one of an estimated position and/or an estimated velocity based, at least in part, on a plurality of measurements in a measurement set, said plurality of measurements comprising said validated measurement.

21. The apparatus as recited in claim 12, wherein said validated measurement comprises an operatively one-sided isolated measurement as a result of operatively one-sided isolating said initial measurement, and further comprising:

with said means for estimating position/velocity/time, determining at least one of an estimated position and/or an estimated velocity based, at least in part, on a plurality of measurements in a measurement set, but wherein said plurality of measurements do not comprise said operatively one-sided isolated measurement.

22. The apparatus as recited in claim 12, further comprising:

means for operatively isolating at least one other initial measurement by removing said at least one other initial measurement based on said at least one other initial measurement being determined to be suspect and based on a minimum number of measurements remaining available.

23. An apparatus comprising:

memory capable of storing a measurement set associated with a plurality of position/velocity/time related signals, said measurement set comprising a least an initial measurement for use in a position/velocity/time estimation filter;

at least one processing unit coupled to said memory to determine whether said initial measurement is suspect based, at least in part, on at least one threshold, and, based on said initial measurement being determined to be suspect, establish said initial measurement as a validated measurement by either: (1) re-weighting said initial measurement with a non-zero weight; and/or (2) one-sided isolating said initial measurement by one-sided de-weighting said initial measurement using different thresholds for positive and negative residuals, and provide said validated measurement to said memory for storage in said measurement set and subsequent use in said position/velocity/time estimation filter.

24. The apparatus as recited in claim 23, wherein said initial measurement is associated with at least a first signal, and further comprising at least one of:

a receiver coupled to at least said memory to receive at least said first signal from at least one of a Satellite Positioning System (SPS), a Space Vehicle (SV), and/or a Global Navigation Satellite System (GNSS), or a Ground based transmitter (GBT), and provide said initial measurement to said memory; and/or a position, velocity, and/or time related sensor coupled to at least said memory to generate said first signal and provide said initial measurement to said memory.

25. The apparatus as recited in claim 24, wherein said initial measurement is associated with at least one of: a signal strength of said first signal; a type of said first signal; a source of said first signal; a pseudorange (PR) measurement as determined based, at least in part, using said first signal based; and/or, a pseudorange rate (PRR) measurement as determined based, at least in part, using said first signal.

26. The apparatus as recited in claim 25, wherein said pseudorange rate (PRR) measurement is determined based, at least in part, using a Doppler velocity and/or carrier phase portion of said first signal.

27. The apparatus as recited in claim 23, wherein said at least one threshold comprises at least one of a predetermined threshold value stored in said memory, and/or an adaptive threshold value and/or a probabilistic-based threshold value determined by said at least one processing unit.

28. The apparatus as recited in claim 23, further comprising a Kalman filter coupled to at least said memory to serve as said position/velocity/time estimation filter.

29. The apparatus as recited in claim 24, wherein:

said position/velocity/time estimation filter determines a predicted measurement for said first signal and a measurement innovation based, at least in part, on said predicted measurement and said initial measurement; and said at least one processing unit determines whether said initial measurement is suspect based, at least in part, on said measurement innovation.

30. The apparatus as recited in claim 29, wherein said position/velocity/time estimation filter determines said measurement innovation based, at least in part, on at least one of a time updated state and/or at least one trial state.

31. The apparatus as recited in claim 23, wherein said validated measurement comprises at least one of an operatively deweighted measurement or an operatively one-sided deweighted measurement as a result of operatively re-weighting said initial measurement, and wherein:
said position/velocity/time estimation filter determines at least one of an estimated position and/or an estimated velocity based, at least in part, on a plurality of measurements in said measurement set, said plurality of measurements comprising said validated measurement.

32. The apparatus as recited in claim 23, wherein said validated measurement comprises an operatively one-sided isolated measurement as a result of operatively one-sided isolating said initial measurement, and wherein:
said position/velocity/time estimation filter determines at least one of an estimated position and/or an estimated velocity based, at least in part, on a plurality of measurements in said measurement set, but wherein said plurality of measurements do not comprise said operatively one-sided isolated measurement.

33. The apparatus as recited in claim 23, wherein based on at least one other initial measurement being determined to be suspect, said at least one processing unit operatively isolates said at least one other initial measurement by removing said at least one other initial measurement based on a minimum number of measurements remaining available.

34. An article for improving an estimated position/velocity/time calculation of a positioning device, comprising:
a non-transitory computer-readable medium having computer implementable instructions stored thereon that when implemented by one or more processing units in the positioning device cause the positioning device to:
determine whether an initial measurement for use in a position/velocity/time estimation filter is suspect based, at least in part, on at least one threshold;
based on said initial measurement being determined to be suspect, establish said initial measurement as a validated measurement by either: (1) re-weighting said initial measurement with a non-zero weight; and/or (2) one-sided isolating said initial measurement by one-sided de-weighting said initial measurement using different thresholds for positive and negative residuals; and
store an estimated position/velocity/time calculated or updated based on said validated measurement in a memory of the positioning device.

35. The article as recited in claim 34, wherein said initial measurement is associated with at least a first signal, said first signal being received from at least one of a Satellite Positioning System (SPS), a Space Vehicle (SV), a Global Navigation Satellite System (GNSS), a Ground based transmitter (GBT), or a position, velocity, and/or time related sensor.

36. The article as recited in claim 35, wherein said initial measurement is associated with at least one of: a signal strength of said first signal; a type of said first signal; a source of said first signal; a pseudorange (PR) measurement as determined based, at least in part, using said first signal based; and/or, a pseudorange rate (PRR) measurement as determined based, at least in part, using said first signal.

37. The article as recited in claim 36, wherein said pseudorange rate (PRR) measurement is determined based, at least in part, using a Doppler velocity and/or carrier phase portion of said first signal.

38. The article as recited in claim 34, wherein said at least one threshold comprises at least one of a predetermined threshold value, an adaptive threshold value, and/or a determined probabilistic-based threshold value.

39. The article as recited in claim 34, wherein said position/velocity/time estimation filter comprises a Kalman filter.

40. The article as recited in claim 35, further comprising computer implementable instructions, which if implemented by said one or more processing units, enable the positioning device to:
determine a predicted measurement for said first signal using said position/velocity/time estimation filter;
determine a measurement innovation based, at least in part, on said predicted measurement and said initial measurement; and
determine whether said initial measurement is suspect based, at least in part, on said measurement innovation.

41. The article as recited in claim 40, further comprising computer implementable instructions, which if implemented by said one or more processing units, enable the positioning device to:
determine said measurement innovation based, at least in part, on at least one of a time updated state of said position/velocity/time estimation filter and/or at least one trial state of said position/velocity/time estimation filter.

42. The article as recited in claim 34, wherein said validated measurement comprises at least one of an operatively deweighted measurement or an operatively one-sided deweighted measurement as a result of operatively re-weighting said initial measurement, and further comprising computer implementable instructions, which if implemented by said one or more processing units, enable the positioning device to:
with said position/velocity/time estimation filter, determine at least one of an estimated position and/or an estimated velocity based, at least in part, on a plurality of measurements in a measurement set, said plurality of measurements comprising said validated measurement.

43. The article as recited in claim 34, wherein said validated measurement comprises an operatively one-sided isolated measurement as a result of operatively one-sided isolating said initial measurement, and further comprising computer implementable instructions, which if implemented by said one or more processing units, enable the positioning device to:
with said position/velocity/time estimation filter, determine at least one of an estimated position and/or an estimated velocity based, at least in part, on a plurality of measurements in a measurement set, but wherein said plurality of measurements do not comprise said operatively one-sided isolated measurement.

44. The article as recited in claim 34, further comprising computer implementable instructions, which if implemented by said one or more processing units, enable the positioning device to:
operatively isolate at least one other initial measurement by removing said at least one other initial measurement based on said at least one other initial measurement being determined to be suspect and based on a minimum number of measurements remaining available.

* * * * *